UNITED STATES PATENT OFFICE.

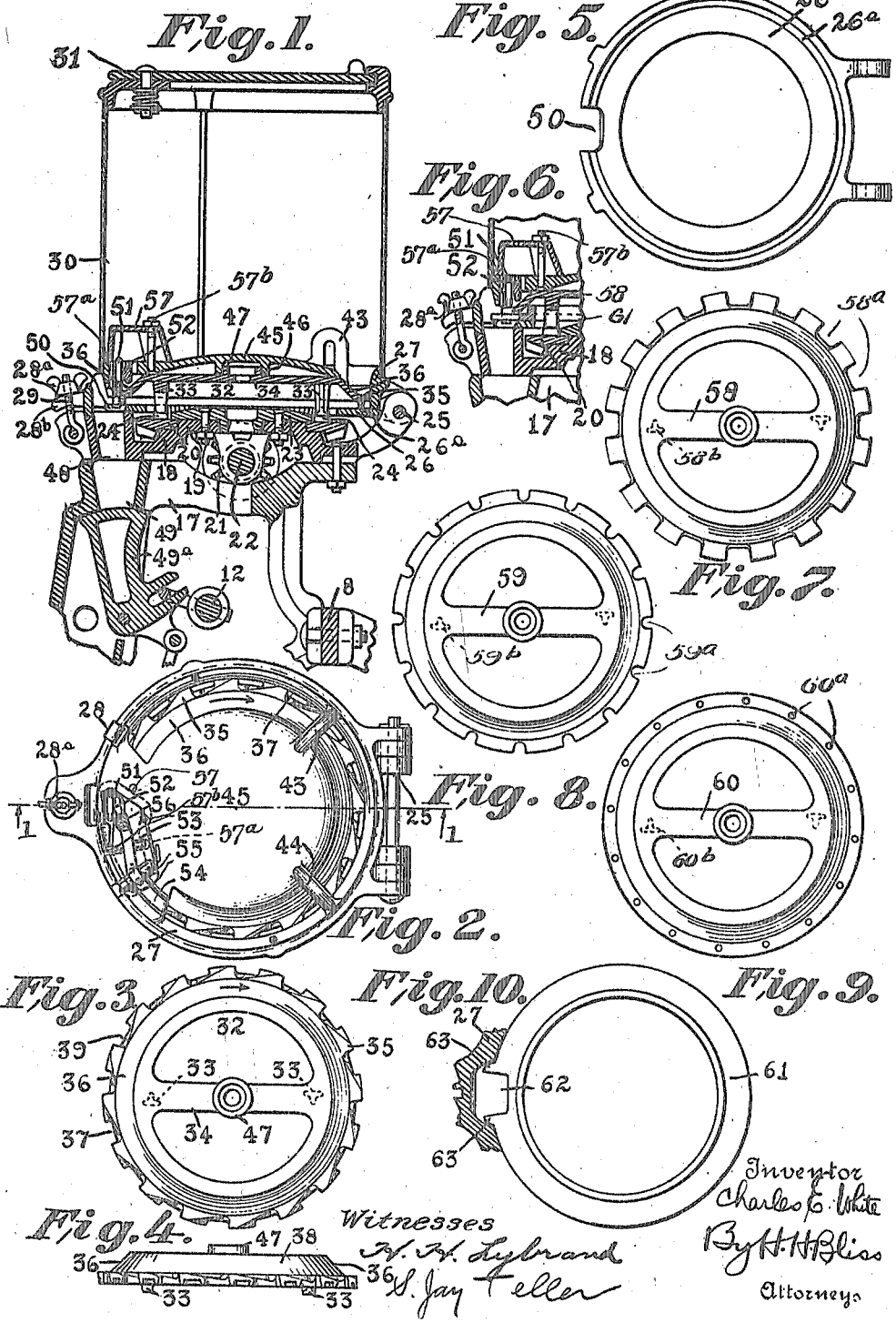

CHARLES E. WHITE, OF MOLINE, ILLINOIS, ASSIGNOR TO DEERE & MANSUR COMPANY, OF MOLINE, ILLINOIS, A CORPORATION OF ILLINOIS.

PLANTING MECHANISM.

1,286,464.  Specification of Letters Patent.  Patented Dec. 3, 1918.

Application filed October 21, 1914. Serial No. 867,838.

*To all whom it may concern:*

Be it known that I, CHARLES E. WHITE, a citizen of the United States, residing at Moline, in the county of Rock Island and State of Illinois, have invented certain new and useful Improvements in Planting Mechanisms, of which the following is a specification, reference being had therein to the accompanying drawing.

This invention relates to improvements in corn planters of the class in which each is provided with a seeding mechanism having a delivery device which includes, as one of its elements, a rotatable seed plate having cells each adapted to receive a single kernel only.

The object of the invention is to provide an improved means whereby the planting mechanism can, at will, be made adapted for the planting of different sorts of seeds varying in size and shape.

Of the accompanying drawing which illustrates one embodiment of the invention—

Figure 1 is a vertical sectional view taken along the line 1—1 of Fig. 2.

Fig. 2 is a plan view of the mechanism with the hopper removed, and with the cut-off and knock-out housing removed and the position occupied by the housing when in use indicated by broken lines.

Figs. 3 and 4 are detail views of one of the seed plates adapted for the planting of ordinary corn.

Fig. 5 is a detail view of the plate or ring which supports the seed plate.

Fig. 6 is a fragmentary sectional view similar to Fig. 1 and showing another form of seed plate and a supplemental filler ring.

Figs. 7, 8 and 9 are views showing different forms of seed plates of the character shown in Fig. 6.

Fig. 10 is a plan view partly in section and showing in detail the filler ring adapted for use with the seed plates shown in Figs. 7, 8 and 9.

The front frame of the planter comprises transverse bars of which one is shown at 8. Secured to these transverse bars are castings of which one is shown at 17. 12 is a rock shaft adapted to be actuated by a check wire in the usual way.

Mounted on the upper parts of the runner supporting brackets or castings 17 of the planter are the seed-holding and separating mechanisms, of which but one is shown. Bolted to the casting 17 is a base plate 18. The plate is formed with a central circular recessed boss 19 which serves to support a drive or gear ring 20. The ring is provided on its lower side with bevel gear teeth adapted to mesh with the teeth of a bevel pinion 21 on a transverse seeder shaft 22 having a bearing at each end in the base plate 18. The gear ring 20 is held in place by a cap plate 23, bolted to the base plate 18. Upon the upper face of the gear ring is a circular series of upwardly projecting teeth 24 for a purpose to be described.

26 indicates a ring plate, hinged to the base casting at 25. It lies immediately below the seed plate, to be described, and furnishes the bottom or lower closure for the seed cells. It has a large central circular opening of a diameter sufficient to permit the seed-plate-driving parts to freely rotate. It is invertible, and on one of its horizontal faces it has a ring groove or continuous depression $26^a$. Its other horizontal face is continuous or ungrooved. Groove $26^a$ is concentric with the cells formed in the seeder plate and lies at a distance, radially, equal to the radial distance of the cells from the center. When the ring plate 26 is placed with the grooved side upward, the cells are relatively deeper and can receive kernels of the wider sort. When it is inverted, its flat or ungrooved surface lies below the cells, and they are relatively shallower, as is desirable when seeds of the narrower sort are being planted.

27 is a ring-like casting at the bottom of the hopper.

28 is a spring latch for securing the plate 26 and the hopper ring 27 together. At $28^a$ there is a lock of the common sort, formed of a bolt 29, pivoted to base 18, and a slotted lug at $28^b$.

30 represents the hopper, box or can, with cover 31. 32 is the seed plate supported on ring plate 26, and having its lower peripheral part adjacent to the inner surface of hopper bottom ring 27. It is provided with downward projecting lugs 33 which engage with teeth 24 on gear ring 20. It has an upper part 34 with a horizontal cross bar, an outward and downward sloping part 36, and a bottom horizontal part 35, all cast in one integral piece of metal. The seed cells are indicated by 37, these being recesses in the periphery of the bottom part 35 with their outer sides open. The inner walls 39 are approximately parallel with the outermost circle of the plate. Each cell is intended to receive and hold a single kernel of corn with its wider faces or flat surfaces vertical, and with its longitudinal axis horizontal.

At the center of the hopper bottom there is a cap plate 45, carried by suitable bridges 43 and 44, cast integral therewith. It is dome shaped, with a flat curvature, and the kernels readily slip thereon gradually, outward and downward. The outer edge of this cap registers, approximately, with the top circular edge of the inclined or tapering part 36 of the seed plate.

The latter is centered by means of the cap 45, it having loose engagement therewith, of such nature that it is prevented from crowding in any direction, radially, toward the surrounding ring part of the hopper bottom ring 27. This centering is obtained by companion parts which loosely interengage and permit the seed plate to be separated from the cap and removed without requiring the detaching of bolts or any other fixed devices. The means shown for this are an open bottom boss or flange 46 (cast integral with the underside of the cap 45) and a hollow pin, stud or lug 47 cast with the plate 32, the latter fitting snugly in the boss 46, though detachable, as aforesaid, therefrom.

The base plate 18 and the main casting 17 are provided with alined vertical openings 48, 49. In the retaining plate 26 there is also formed an opening or notch 50 which registers with the openings 48, 49. Mounted at the lower end of the opening 49 is a valve 49ª connected to be opened and shut as the rock shaft 12 is oscillated.

As the seed plate is rotated, the seed cells are brought over these openings and the seeds pass downward through them. For positively ejecting the seeds from the cells I provide a knock-out device having a roller 51 mounted on an arm 52, which is supported by trunnions 53 resting in notches or recesses in the hopper bottom plate 27. The roller is adapted to reciprocate and partly enter the cells as they pass and to force the seeds downward. In order to prevent more than a single seed from entering one cell and being carried to the point of discharge, I provide a cut-off 54, which is supported on trunnions 55 resting in recesses in the hopper bottom plate. A spring 56 engages the knock-out and the cut-off and serves to hold each of them in its lowermost position. A cap or housing 57 is secured to the cap plate 45 by bolt 57ᵇ and is so formed that its bottom lateral edges overlie the ends of the trunnions 53 and 54 of the knock-out and cut-off devices, which are protected by the casing, as indicated at 57ª in Figs. 1, 2 and 6, so as to hold the same in their seats in the cap plate.

The seed plate 32 is intended to be used for ordinary corn and it is relatively thick at its periphery, the thickness corresponding approximately to the width of the corn kernels. It frequently happens that the farmer desires to use his planter not only for planting ordinary corn but also for planting other seeds, such, for instance, as broom corn or peas. And it is also sometimes desirable even when planting ordinary corn to select the seeds so that they lie flatwise instead of edgewise as is usually preferred. For the selection of corn flatwise or for the selection of peas or broom corn it is necessary to use a much thinner plate than the plate 32, such as those shown in Figs. 7, 8 and 9.

The plate 58 in Fig. 7 is intended for the separation of ordinary corn or maize flatwise. This plate has a high central part, a low peripheral part, and an inclined part which connects the central and peripheral parts, just as in the case of the plate 32; but in the case of plate 58 the peripheral part is made thinner than the corresponding part of the plate 32, its thickness being approximately that of a kernel of corn, and is formed with a circumferential series of cells each of which is adapted to receive flatwise a single kernel only with its longest dimension circumferentially disposed. The inner side or edge wall of each cell is disposed adjacent the bottom of the inclined part of the plate, that is to say, in such a manner that the kernels pressed against the inclined part, are guided thereby into the cells. With the cells arranged as described, it will be seen that the distance from the inclined part outward to the surrounding stationary wall of the ring 27, is less than the length of the kernels so that any kernels which tend to bridge lengthwise across from the inclined part of the moving seed plate to the stationary ring 27 are turned and caused to slide down the incline toward the zone of the seed cells.

The plate 59, shown in Fig. 8, is intended for use with peas, the plate being in the main like the plate 58 but having its peripheral part formed with a series of cells 59ª, each shaped to receive a single spheroidal seed such as a pea. The plate 60 shown in Fig. 9 has its seed cells 60ª shaped to receive, singly, smaller spheroidal seeds or kernels such as those of broom corn.

When one of the thinner plates shown in Figs. 7, 8 and 9 is used, use is also made of a filler plate 61 shown in detail in Fig. 10. This is placed directly upon the ring plate 26 and is provided with an opening at 62 adapted to register with the openings 50, 48 and 49 in the castings 26, 18 and 17 respectively. The plate 61 has outward projecting lugs 63, 63 adapted to engage with the walls of the casting 27 to prevent the plate from turning.

The seed plates 58, 59 and 60 are formed with depending lugs 58$^b$, 59$^b$ and 60$^b$, respectively, which are formed and proportioned to engage and be driven by the teeth 24 on the gear 20 in the well known way.

It will be seen that by the provision of the supplemental filler plate the planter is adapted for planting the seeds of a variety of shapes and sizes. In fact it will be observed that by my invention I have made provision for the planting of seeds having any one of three vertical dimensions. With the arrangement of parts shown in Fig. 1 relatively wide corn kernels can be planted edgewise. When narrow kernels are to be planted the plate 26 can be inverted and the vertical height of the cells reduced. When still narrower seeds are to be planted, such as peas or broom corn, or when flatwise separation of maize is desired, the supplemental filler plate can be inserted and one of the thinner plates used. And it will be further observed that the supplemental filler plate can be put in place at any time irrespective of the position in which the plate 26 may be. In other words it is immaterial, as concerning the placing of the filler plate, whether the plate 26 be arranged with the groove uppermost or with the groove lowermost.

The plate shown in Figs. 6 and 7, adapted for the separating of ordinary corn kernels, is found to be very efficient and accurate. The sharply sloping annular wall adjacent the cells causes the seeds to move outward toward the cells and, as the inner walls of the cells are also slightly inclined near their upper edges, the seeds can readily enter. The space between the inclined wall of the plate, and the vertical wall of the hopper is so narrow that the seeds can not lie therein crosswise but must be turned endwise to enter the cell. This turning movement is caused by the rotary movement of the plate itself.

What I claim is:

1. In a seed separating and delivering mechanism for corn planters, the combination with a base structure, a seed hopper mounted on the base structure, a relatively thick rotary seed plate with peripheral edge-drop seed cells operatively mounted in the bottom of the seed hopper, and an invertible plate operatively mounted beneath the seed plate and having on each of its sides an annular surface for closing the bottoms of the seed plate cells, one of said annular surfaces, when in operation, being disposed in a plane lower, in relation to the seed plate, than the other closure surface when it is in operation, of a non-rotary filler plate adapted to be positioned at will above the invertible plate, to provide a bottom closure in a relatively high plane for the cells of a relatively thin seed plate, whereby the mechanism is adapted for the separation of corn kernels edgewise, for the separation of corn kernels flatwise and for the separation of spheroidal seeds.

2. In a seed separating and delivering mechanism for corn planters, the combination with a base structure, a seed hopper mounted on the base structure, a relatively thick rotary seed plate with peripheral edge-drop seed cells operatively mounted in the bottom of the seed hopper, and an invertible plate operatively mounted beneath the seed plate and having on each of its sides an annular surface for closing the bottoms of the seed plate cells, one of said annular surfaces, when in operation, being disposed in a plane lower, in relation to the seed plate, than the other closure surface when it is in operation, of a non-rotary filler plate adapted to be positioned at will above the invertible plate, when the latter is in either of its operative positions, to provide a bottom closure in a relatively high plane for the cells of a relatively thin seed plate, whereby the mechanism is adapted for the separation of corn kernels edgewise, for the separation of corn kernels flatwise and for the separation of spheroidal seeds.

3. In a planter mechanism for separating and delivering maize seeds having a width greater than their thickness and a length greater than their width and of approximately predetermined size, the combination of a circular wall, a rotary seed plate disposed within said wall and having a high central part, a low peripheral part and a sharply inclined part connecting the central and peripheral parts, the said peripheral part being provided with a circumferential series of peripheral seed cells each arranged with its inner side adjacent the said inclined part and adapted to hold flatwise a single kernel only with its wider faces horizontal and its longest dimension circumferential, and a bottom wall below the seed plate providing a bottom closure for the cell.

In testimony whereof, I affix my signature, in presence of two witnesses.

CHARLES E. WHITE.

Witnesses:
BAILEY W. AVERY,
OSCAR F. LUNDAHL.